Jan. 7, 1930.        A. L. EASTMAN        1,742,649
              IDENTIFICATION DEVICE
                Filed April 30, 1928

Inventor
Algernon L. Eastman

By Clarence A. O'Brien
                    Attorney

Patented Jan. 7, 1930

1,742,649

UNITED STATES PATENT OFFICE

ALGERNON LINWOOD EASTMAN, OF BEMIS, MAINE

IDENTIFICATION DEVICE

Application filed April 30, 1928. Serial No. 273,982.

The present invention relates to improvements in identification tags, and has reference more particularly to a method of banding fish for identification and conservation.

One of the important objects of the present invention is to provide an identification tag that is of such construction as to be capable of being secured on the cordal fin or tail of a fish that is caught, the fish being placed back into the water after the identification tag has been attached whereby a record may be kept to enable a person to ascertain from time to time such information as the increase in the weight of the fish, the place where the fish was previously caught, and so forth.

A further object is to provide an identification tag that can be readily and easily attached on the tail or cordal fin of the fish against accidental displacement therefrom.

A still further object of the invention is to provide an identification tag which is simple in construction, inexpensive, strong and durable, and further well adapted to the purpose for which it is designed.

Other objects of the invention will become apparent as the description of the invention proceeds and when taken in connection with the accompanying drawing.

In the accompanying drawing, forming a part of this application and in which like numerals designate like parts throughout the several views.

Figure 1:
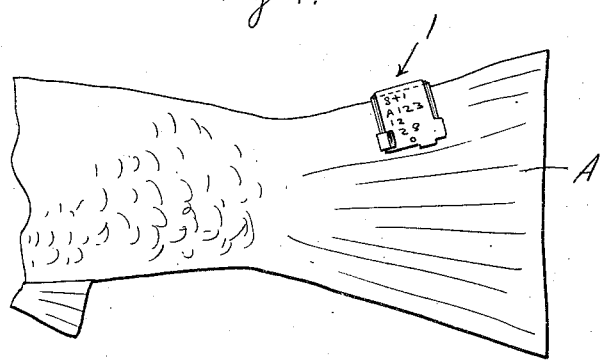
Figure 1 is a perspective view of the identification tag embodying my invention, showing the manner in which it is attached to the cordal fin or tail of a fish.

In the drawing, wherein for the purpose of illustration is shown the preferred embodiment of my invention, the numeral 1 designates generally the identification tag embodying my invention, the same being constructed from a rectangular piece of metal. This blank 2 is formed at one pair of diagonally opposed corners with the bendable laterally projecting tongues 3 and 4 respectively that extend outwardly from the side edges of the blank, the ends of these tongues being sharpened for a purpose to be hereinafter more fully described.

An ear 5 extends outwardly from one end of the blank adjacent the tongue 3.

Figure 2:
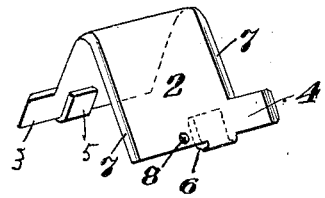
Figure 2 is a perspective view of the identification tag, showing the same in its open position.
Figure 3:
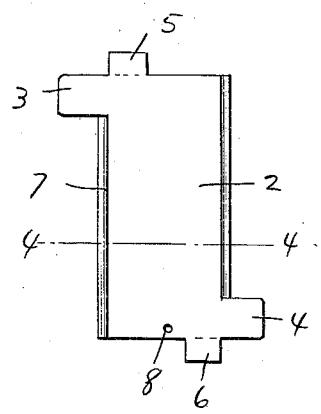
Figure 3 is a top plan view of the blank from which the identification tag is constructed.
Figure 4:
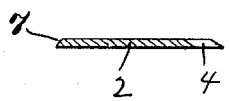
Figure 4 is a transverse section taken approximately on the line 4—4 of Figure 3.

A similar ear 6 extends outwardlly from the opposite end of the blank adjacent the tongue 4 as clearly shown in Figure 3 and these ears are bent inwardly for disposition against the inner side of the blank as shown very clearly in Figure 2. The purpose of these ears will be also presently described. The side edges of the blanks 2 are sharpened or rather bevelled as shown at 7.

The blank 2 is bent along its transverse center so that the identification tag will be of substantially inverted V-shaped formation when positioned over the upper edge of the cordal fin or tail A of a fish that has been caught, and the sharpened tongues 3 and 4 are disposed inwardly through the fin or tail, the tongues being disposed in opposite directions and after the sharpened ends of the tongues have been projected through the respective sides of the fins, the free end portions of the tongues are bent back upon the adjacent sides of the tag, as indicated very clearly in Figure 1, to positively secure the tag on the fin against casual displacement therefrom, and the inwardly bent ears will space the tags so that the tag will not close too tightly on the cartilege of the fin.

Furthermore, the bevelled edges 7 will lessen the resistance of the tag to the passage through the water while attached on the fin or tail of the fish through the water.

The tag may have arranged on its outer face suitable indicating indicia such as the name of the place where the fish is caught, the weight of the fish, the date, etc.

While I have shown the identification tag as being attached to the tail of the fish, the same may be equally as well attached to the dorsal fins or gills.

It will be observed that one end of the blank is formed with an opening 8, whereby a series of tags may be strung on a line or cord and carried by the fisherman prior to attaching the tag to the captured fish.

The simplicity of my improved device, enables the tag to be manufactured at a very low cost and furthermore, the same can be readily and easily attached or removed without the use of any tools.

While I have shown the preferred embodiment of my invention, it is to be understood that various changes in the size, shape, and arrangement of parts may be resorted to, without departing from the spirit of the invention or the scope of the appended claims.

Having thus described my invention, what I claim as new is:

1. In an identification device for captured fish, a sheet metal tag of substantially V-shaped formation, means carried by the tag for securing the same either on one of the fins or on the tail of the fish, the edges of the V-shaped tag being beveled to lessen the resistance of the tag to the passage through water while attached.

2. In an identification device for captured fish, a sheet metal tag of substantially V-shaped formation, and means carried by the tag for securing the same either on one of the fins or on the tail of the fish, said last mentioned means comprising sharpened tongues formed on one pair of diagonally opposed corners and extending outwardly from the opposite side edges of the arms of the V-shaped tag, said tongues adapted to penetrate the fin or tail, the free ends of the tongues being bent inwardly for disposition over the opposite arms of the V-shaped tag.

3. In an identification device for captured fish, a sheet metal tag of substantially V-shaped formation, and means carried by the tag for securing the same either on one of the fins or the tail of the fish, said last mentioned means comprising sharpened tongues formed on one pair of diagonally opposed corners and extending outwardly from the opposite side edges of the arms of the V-shaped tag, said tongues adapted to penetrate the fin or tail, the free ends of the tongues being bent inwardly for disposition over the opposite arms of the V-shaped tag, and spacing ears formed on the ends of the arms of the V-shaped tag for disposition adjacent the respective tongues, said ears being bent against the inner faces of the arms of the V-shaped tags to limit the inward movement of the arms with respect to the fin.

4. In an identification device for captured fish, a sheet metal tag of substantially V-shaped formation, and means carried by the tag for securing the same either on one of the fins or the tail of the fish, said last mentioned means comprising sharpened tongues formed on one pair of diagonally opposed corners and extending outwardly from the opposite side edges of the arms of the V-shaped tag, said tongues adapted to penetrate the fin or tail, the free ends of the tongues being bent inwardly for disposition over the opposite arms of the V-shaped tag, and spacing ears formed on the ends of the arms of the V-shaped tag for disposition adjacent the respective tongues, said ears being bent against the inner faces of the arms of the V-shaped tag to limit the inward movement of the arms with respect to the fin, the side edges of the tag being beveled to lessen the resistance of the tag to the passage through water while attached.

In testimony whereof I affix my signature.

ALGERNON LINWOOD EASTMAN.